(12) United States Patent
Keller et al.

(10) Patent No.: US 8,020,661 B2
(45) Date of Patent: Sep. 20, 2011

(54) STEERING SYSTEM WITH INTEGRATED STRAIN GAUGE

(75) Inventors: Jens Keller, Solingen (DE); Marco Wolff, Frechen (DE)

(73) Assignee: tedrive Holding B.V., NK Heerlen (NL)

( * ) Notice: Subject to any disclaimer, the term of this patent is extended or adjusted under 35 U.S.C. 154(b) by 273 days.

(21) Appl. No.: 12/355,031

(22) Filed: Jan. 16, 2009

(65) Prior Publication Data

US 2009/0178877 A1   Jul. 16, 2009

(30) Foreign Application Priority Data

Jan. 16, 2008 (DE) .......................... 10 2008 004 737
Mar. 14, 2008 (DE) .......................... 10 2008 014 206

(51) Int. Cl.
*B62D 5/04* (2006.01)
(52) U.S. Cl. ....................................................... 180/444
(58) Field of Classification Search ................... 180/444
See application file for complete search history.

(56) References Cited

U.S. PATENT DOCUMENTS

| 3,877,319 | A | * | 4/1975 | Cooper ........................... 74/492 |
| 3,934,486 | A | * | 1/1976 | Becker et al. ................... 74/492 |
| 4,509,386 | A | * | 4/1985 | Kimberlin ....................... 74/492 |
| 4,593,780 | A | * | 6/1986 | Saito .............................. 180/444 |
| 4,629,024 | A | * | 12/1986 | Buike et al. .................... 180/444 |
| 4,756,376 | A | * | 7/1988 | Shimizu .......................... 180/444 |
| 4,825,972 | A | * | 5/1989 | Shimizu .......................... 180/444 |
| 5,924,519 | A | * | 7/1999 | Shimizu et al. ................. 180/444 |
| 6,390,505 | B1 | * | 5/2002 | Wilson ........................... 280/775 |
| 6,634,454 | B2 | * | 10/2003 | Sugitani et al. ................ 180/402 |
| 6,960,145 | B2 | * | 11/2005 | Fraley et al. ................... 474/134 |
| 7,240,760 | B2 | * | 7/2007 | Sherwin ......................... 180/421 |
| 2002/0081147 | A1 | * | 6/2002 | Gianaris et al. ................ 403/223 |
| 2005/0247513 | A1 | * | 11/2005 | Turner ........................... 180/444 |

* cited by examiner

*Primary Examiner* — Kevin Hurley
*Assistant Examiner* — Michael Stabley
(74) *Attorney, Agent, or Firm* — Summa, Additon & Ashe, P.A.

(57) ABSTRACT

The invention relates to a steering system (10) for a motor vehicle. It is characterized in that at least one component part of the steering system (10) is made from a fiber composite material and that a strain gauge (16) for measuring a steering torque is integrated at least in parts into the fiber composite plastic material.

16 Claims, 2 Drawing Sheets

STEERING SYSTEM WITH INTEGRATED STRAIN GAUGE

CROSS-REFERENCE TO PRIORITY APPLICATIONS

This application is a continuation of and claims the benefit of the commonly assigned German Patent Application Serial No. 10 2008 004 737.6 (filed Jan. 16, 2008, in the German Patent Office), and the commonly assigned German Patent Application Serial No. 10 2008 014 206.9 (filed Mar. 14, 2008, in the German Patent Office), both of which are hereby incorporated by reference in their entirety.

FIELD OF THE INVENTION

The present invention relates to a steering system for a motor vehicle comprising a steering input shaft and a strain gauge principle.

BACKGROUND

Automotive steering systems incorporate a steering wheel for operation through a driver, said steering wheel introducing the steering torque applied to an axle with a steerable wheel through a steering column and a gear. In an effort to reduce the steering wheel forces required by a driver upon steering when the vehicle is standing still, during manoeuvring or at low driving speeds, many vehicles have steering assistance, which is referred to as power assisted steering.

Manual, hydraulic, electro-hydraulic but also increasingly electromechanical steering systems are being utilized in vehicles. Through direct intervention in the respective electronics and data processing of the vehicle, the force required to affect steering (also referred to as "steering feel") can be adapted to the corresponding type of vehicle and the respective driving situation. The torque applied by the driver to the steering system remains the elementary variable when seeking a desired steering feel and must be measured when incorporating power assisted steering. Irrespective of the physical principle of steering assistance, actual assistance via a power assisted mechanism depends on the applied torque if one desires to acquire a realistic driving feel.

If in hydraulic steering the amount of assistance is provided by the mechanically operated rotary slide valve, conversion of the torque into an electrical signal is always needed in case of assistance through an electric actuator.

Examples for such electromechanically assisting steering systems are:

Single-/double pinion Electromechanic Power Assisted Steering (EPAS);

Centric-/concentric rack EPAS; and

Column EPAS.

Electromechanical steering systems mainly find application in subcompact or mid-size cars because the power provided by the 12V onboard power system is limited. Accordingly, vehicles capable of bearing a high axle load cannot operate or are difficult to operate with such electromechanical steering systems. For this reason, work is presently accomplished on systems relying on hydraulic operation in which the steering valve is replaced by an electrically-operated valve. As a result, vehicles capable of bearing high axle loads can be handled without having to obviate the EPAS typical functionalities. It will be understood that such power steering mechanisms require that the torque applied by the driver must be converted into an electrical signal. Examples thereof are:

Electronic valve System (or "E-valve")

Closed-center System

Irrespective of the physical principle of the respective steering assistance, the steering torque serves as a measurement value in generating appropriate steering assistance provided to the driver of the vehicle, wherein the assistance is provided by an actuator such as an electric motor. Accordingly, it is necessary to determine or measure the torque applied by the driver of the vehicle and then convert the measurement of the torque into an electrical signal. Those skilled in the art presently know of different torque sensors by means of which the respective generated steering torque can be detected.

They include for example:

Magnetoelastic sensors making use of the effect that the resistance changes when the magnetic field changes;

Inductive sensors which rely on the physical laws of electromagnetism but do not have two or more coils like above but only one coil;

Hall effect sensors using the Hall effect for measuring magnetic fields and currents for location; or Potentiometric sensors which are passive sensors that rely on a potentiometer and with the help of which the physical variables of length and angle show themselves as analogue electric variables like voltage or current.

Unfortunately, and as a disadvantage, known systems require and rely upon a torsion rod having a predetermined rigidity through the angle of rotation such that the applied steering torque (e.g., a hydraulically operated steering mechanism), is detected and converted into an electrical signal. Such a torsion rod is designed to have a defined rigidity so that the angle of rotation thereof constitutes an admeasurement of the applied torque. The principles described herein above rely upon the measurement of the applied torque (as provided by the relative rotation of the torsion rod) to accomplish conversion of the measurement into an electrical signal. In addition thereto, integration of the torsion rod in the steering assembly represents additional expense in terms of design and production.

It is also known to use strain gauges to determine torques. The basic principle of a strain gauge is based on a change in the electrical resistance of a conductor. Specifically, the electrical resistance of a measurement grid located in the sensor changes upon deformation in the direction of measurement. The cause of the deformation may for example occur through a change in force, pressure or torque. In the current methods of manufacturing strain gauges, a conductive pattern is etched out of a metal foil that is applied onto a carrier film. Then, this carrier film is applied by means of special glue onto the component part of the steering mechanism to be monitored. The manufacture and attachment of the strain gauge are complicated and often cause problems. This is in particular the case if the component part to be monitored is made from an electrically conductive material. In particular, an electrically isolating layer must be provided between the strain gauge and the electrically conductive item (i.e., component part) to be inspected.

SUMMARY OF THE INVENTION

It is the object of the present invention to provide an electromechanical steering system allowing for reliable measurement of the steering torque without using a torsion rod. As far as practicable the steering system should be uncomplicated, simple and economical to build and manufacture, and be subject to as little wear as possible. In accordance with the invention, this object is solved by an electromechanical steering system for an automotive vehicle in which at least one component part of the steering system is made from a fiber composite material and in which a strain gauge for measuring a steering torque is integrated at least in parts into the fiber composite plastic material.

The invention relies on the observation that, when the steering system comprises at least one component part which is not made from a metal or a metal alloy, but from a fiber composite plastic material, it is possible to directly integrate a strain gauge, a metallic conductor, or an entire measurement grid into the corresponding component part made of a fiber composite plastic material. "Integrate" or "integration" refers to construction of the invention wherein the strain gauge or the sensing measurement grid (or the corresponding sensing conductor) is placed directly between the discrete fiber layers of the fiber composite plastic material and that the ends of the strain gauge or the sensing measurement grid (or the corresponding sensing conductor) are led through and out of the fiber composite component part, such that ends are ready for connection to any number of components.

The component parts formed of the fiber composite plastic material and incorporating the strain gauge (or the sensing measurement grid or the corresponding sensing conductor) may include all of the component parts that undergo torsion when torque is applied by the driver. Accordingly, integration may occur preferably in a steering input shaft, an extension shaft, the steering column or any number of component parts of the steering column.

The component part including the strain gauge performs the function of a torque sensor without sacrificing its original function, which is to transmit the torque applied by the driver.

The strain gauge may also be integrated into the fiber composite plastic material in various ways so that a bridge circuit, such as a Wheatstone quarter bridge, a Wheatstone half bridge, or a full bridge can be formed by the occurring resistance.

The fiber composite plastic material may contain glass fibers, carbon fibers or aramid fibers, or a combination thereof. These fiber composite plastic materials are usually characterized by high strength and by a high module of elasticity. Moreover, they are non-ageing and weather-proof as well as heat and fire proof.

The strain gauge can be made solely from electrically conductive material. Alternatively the strain gauge may lack electrically isolated areas, but it can also be isolated with respect to the component part to which or in which it is attached through non-conductive material. The strain gauge can be contacted from the outside through connections projecting out of the fiber composite plastic material.

One possibility of establishing electrical contact is preferably through tapping via a slip ring. As used herein, "tapping" refers to the use of a connector for establishing an electrical connection. In this way, the strain gauge integrated into the fiber composite plastic material is supplied with sufficient operating voltage on one side, and on the other side the actual measurement signal can be tapped through the slip ring. By tapping a slip ring with, for example brushes, the slip ring contacts the strain gauge thereby ensuring an energy supply thereto and the measurement signal. Fixed wiring of the strain gauge may also be envisaged, thereby ensuring a sufficient supply of operating voltage to the strain gauge and tapping of the measurement signal. Such a wiring may, for example, occur through a flat spiral spring (30). In a particularly advantageous implementation, the measurement values are transmitted without contact such as via radio, Bluetooth technology or similar transmission systems.

In accordance with the invention, the strain gauge or the slip ring, the flat spiral spring (30) or the radio receiver can be connected to a control apparatus. The control apparatus can process the steering torque measured by the strain gauge and assist the steering process by means of an electric actuator. A security comparison may also be envisaged with a previously fixed entered or calculated target variable.

Preferably, a bridge amplifier is integrated into the control apparatus. The integrated bridge amplifier can both provide the supply voltage required and also amplify the measurement signal. Depending on the desired amplification, the signal can thereby be provided either in the range of 0V-5V or of 0V-10V. Thereafter, the signal can be converted either in analogue or digital form, and the corresponding torque can be scaled. If the steering system is not used, the output voltage of the bridge amplifier is 0V. When the driver of the vehicle makes a steering movement, the steering input shaft undergoes torsion and the resistance inside of the strain gauge changes. As a result of the movement, the tapped voltage changes in analogue form, depending on the value and the direction of the applied torque.

Herein after, the invention will be described in closer detail with reference to the enclosed drawing. The sole FIG. 1 shows a schematic illustration of an electromechanical steering system of the invention for a motor vehicle.

BRIEF DESCRIPTION OF THE DRAWINGS

The foregoing and other objects and advantages of the invention and the manner in which the same are accomplished will become clearer based on the following detailed description taken in conjunction with the accompanying drawings in which.

DETAILED DESCRIPTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
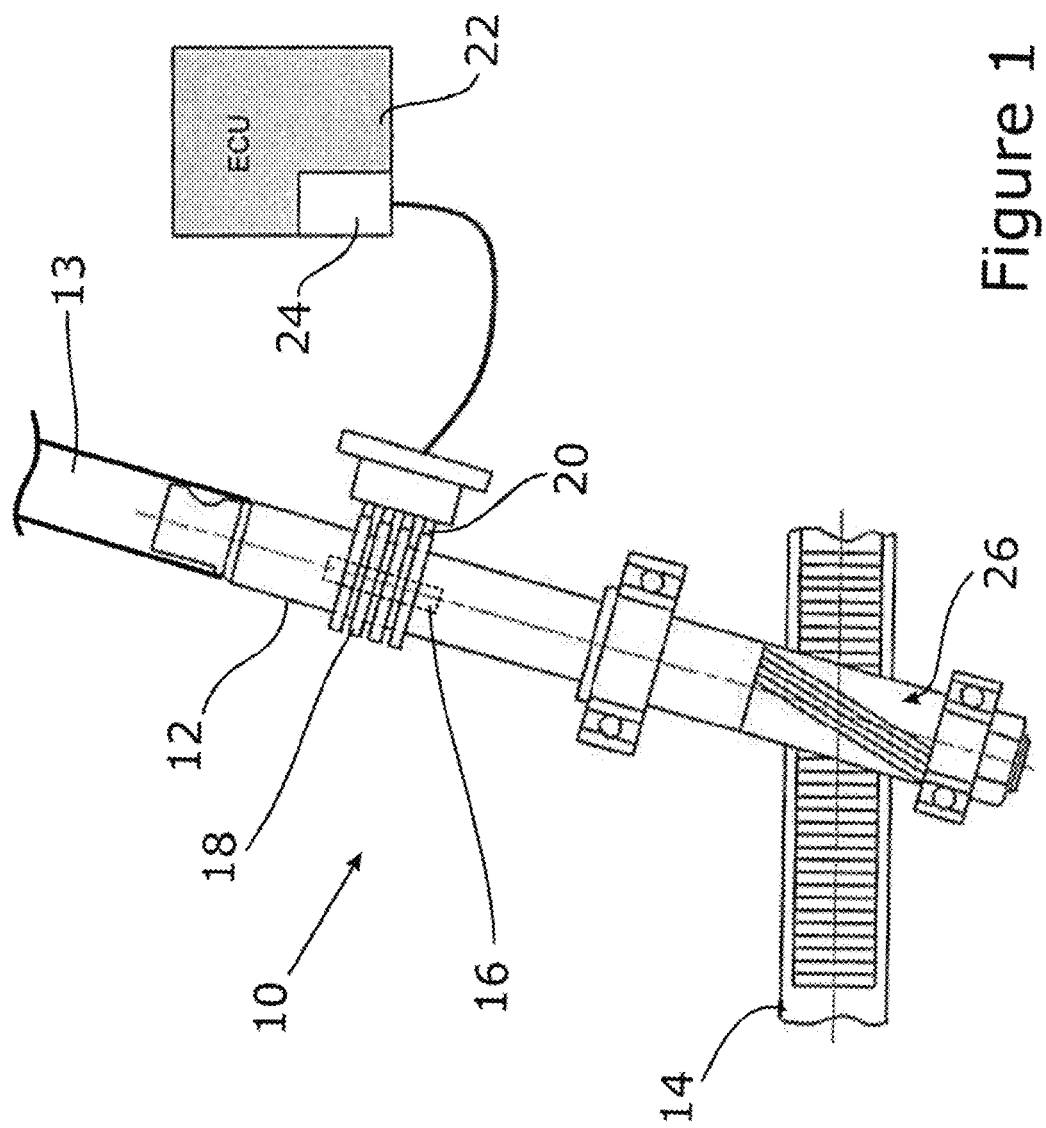
FIG. 1 is a schematic view of a steering system of the present invention.
Figure 2:
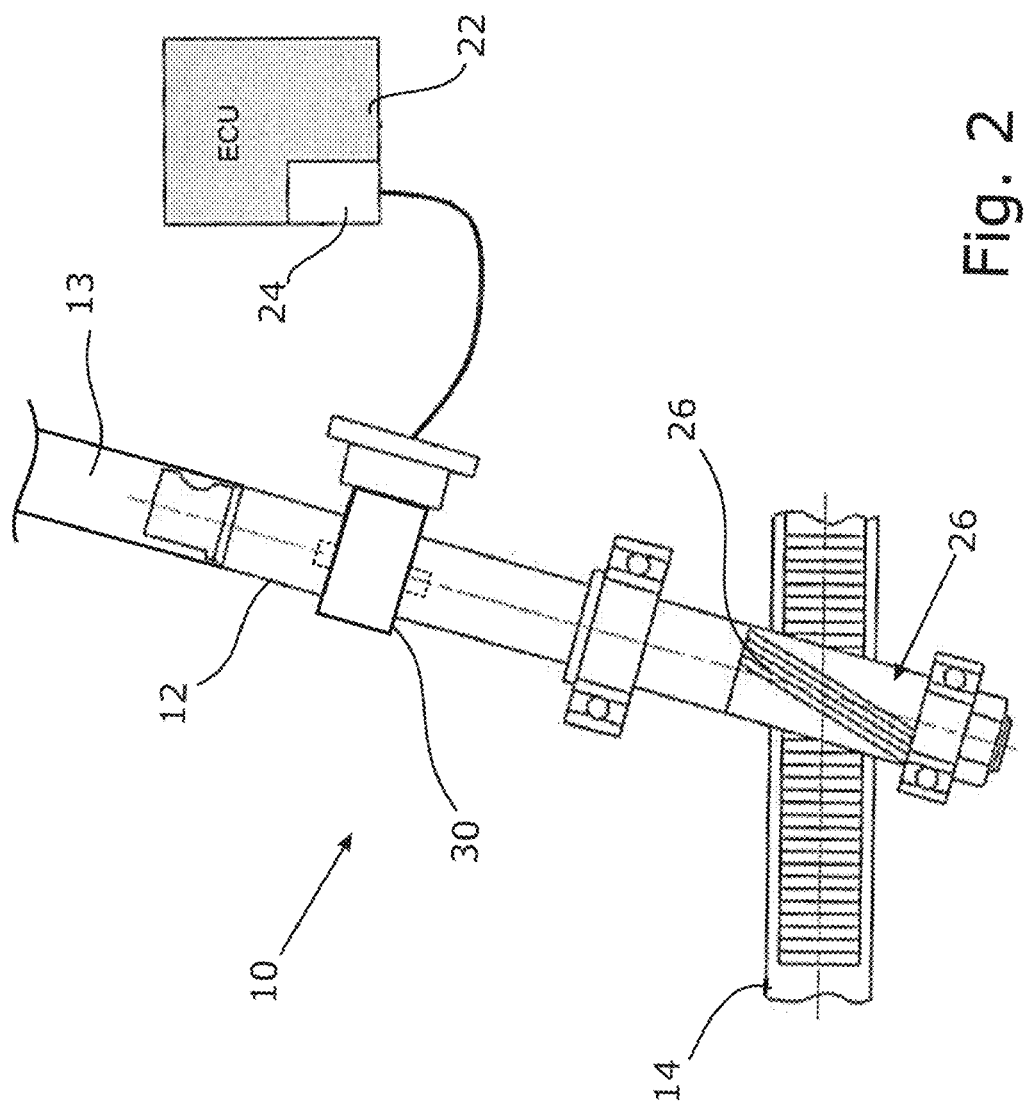
FIG. 2 is another schematic view of the steering system of the present invention.

FIG. 1 illustrates a steering system 10 of the invention for a motor vehicle. The steering system 10 comprises a steering input shaft 12 and an extension shaft 13 as the connection to a steering column. It will be understood that the steering input shaft 12 and extension shaft 13 may collectively be referred to as a steering tower. At its upper end, the steering input shaft 12 is connected to the steering column, and engages with its lower end into a toothed rack 14 via a drive pinion 26 so that the movement of rotation of the steering wheel (not illustrated) is transmitted to the toothed rack 14 through the steering input shaft 12 and the drive pinion 26.

In accordance with the invention, at least part of the steering system 10 consists at least partially of a fiber composite plastic material. In the exemplary embodiment shown, the strain gauge 16 is integrated into the steering input shaft 12. The strain gauge 16 can thereby be integrated into the fiber composite plastic material in any number of ways so that the occurring resistance can form a Wheatstone quarter bridge, a Wheatstone half bridge or a full bridge.

The steering input shaft 12 is surrounded by several slip rings 18 which are tapped through brushes 20. As configured the slip rings 18 and brushes 20 provide contact with the strain gauge 16 which is integrated into the fiber composite plastic material. A control apparatus 22 provides the required supply voltage to the strain gauge. Further, the tapped measurement signal is amplified through a measurement bridge amplifier 24 integrated into the control apparatus 22.

The invention offers a plurality of advantages. By obviating the torsion rod and by providing a multiple function component part, the overall weight of the steering system is reduced and the steering input shaft 12 and the steering pinion can be built as one single component part. Further, the process of mounting the steering input shaft, the torsion rod and the steering pinion is eliminated. Still further, increased rigidity of the steering system is obtained by omitting the torsion rod.

The drawing discloses and describes an exemplary implementation of the present invention; other mechanical arrangements are also possible. The invention is not limited to the exemplary embodiment described; it merely serves to illustrate the invention.

What is claimed is:

1. A steering system (10) for a motor vehicle, wherein at least one component part of said steering system (10) is made from a fiber composite plastic material and a strain gauge (16) for measuring a steering torque and generating a measurement signal is integrated at least partially into the fiber composite plastic material;
   wherein electrical contact of the strain gauge (16) is established through at least one slip ring (18) which supplies the strain gauge (16) with supply voltage and through which the measurement signal may be tapped; and
   wherein slip ring tapping occurs through brushes (20) that are arranged in a steering tower.

2. The steering system (10) as set forth in claim 1, wherein the strain gauge (16) is integrated into a steering input shaft (12).

3. The steering system (10) as set forth in claim 1, wherein the strain gauge (16) is integrated into an extension shaft.

4. The steering system (10) as set forth in claim 1, wherein the strain gauge (16) is integrated into at least one component part of the steering column.

5. The steering system (10) as set forth in claim 1, wherein the fiber composite plastic material comprises fibers selected from glass fibers, carbon fibers or aramid fibers, or combinations thereof.

6. The steering system (10) as set forth in claim 1, wherein electrical contact of the strain gauge (16) is established through a fixedly wired flat spiral spring which supplies the strain gauge (16) with supply voltage and through which the measurement signal may be tapped.

7. The steering system (10) as set forth in claim 1, wherein the measurement signal is tapped without contact.

8. The steering system (10) as set forth in claim 1, wherein supply voltage for the strain gauge (16) is provided and the measurement signal amplified by an amplifier (6) that is integrated into a control apparatus (22).

9. The steering system (10) as set forth in claim 8, wherein the measurement signal is provided to the control apparatus (22) as a function of the selected amplification 0V-5V or 0V-10V and is scaled to the corresponding torque after analogue/digital conversion.

10. The steering system (10) as set forth in claim 8, wherein the amplifier is configured to be a measurement bridge amplifier (24).

11. A steering system (10) for a motor vehicle comprising:
    at least one component part made from a fiber composite plastic material;
    a strain gauge (16) for measuring a steering torque and generating a measurement signal;
    at least one slip ring (18) surrounding the steering input shaft (12) and contacting the strain gauge (16); and
    at least one brush (20) providing contact between the at least one slip ring (18) and the strain gauge (16);
    wherein the at least one component part is selected from a steering input shaft (12), a steering column, or an extension shaft (13);
    wherein the strain gauge (16) is integrated at least partially into the fiber composite plastic material forming the at least one component part;
    wherein the at least one slip ring (18) taps the measurement signal generated by the strain gauge (16) via the at least one brush (20).

12. The steering system (10) as set forth in claim 11 further comprising:
    a flat spiral spring contacting the strain gauge (16);
    wherein the flat spiral spring taps the measurement signal generated by the strain gauge (16).

13. The steering system (10) as set forth in claim 11 further comprising:
    a control apparatus (22) for processing the measurement signal generated by the strain gauge (16) and facilitating steering assistance, the control apparatus (22) in communication with the strain gauge (16); and
    an amplifier (24) for providing supply voltage to the strain gauge (16) and amplifying the measurement signal, the amplifier integrated into the control apparatus (22).

14. A steering system (10) for a motor vehicle, wherein:
    at least one component part of said steering system (10) is made from a fiber composite material and a strain gauge (16) for measuring a steering torque and generating a measurement signal is integrated at least partially into the fiber composite plastic material; and
    electrical contact of the strain gauge (16) is established through a fixedly wired flat spiral spring which supplies the strain gauge (16) with supply voltage and through which the measurement signal may be tapped.

15. A steering system (10) for a motor vehicle, wherein:
    at least one component part of said steering system (10) is made from a fiber composite material and a strain gauge (16) for measuring a steering torque and generating a measurement signal is integrated at least partially into the fiber composite plastic material;
    supply voltage for the strain gauge (16) is provided and the measurement signal amplified by an amplifier (6) that is integrated into a control apparatus (22); and
    the measurement signal is provided to the control apparatus (22) as a function of the selected amplification 0V-5V or 0V-10V and is scaled to the corresponding torque after analogue/digital conversion.

16. A steering system (10) for a motor vehicle comprising:
    at least one component part made from a fiber composite material;
    a strain gauge (16) for measuring a steering torque and generating a measurement signal; and
    a flat spiral spring contacting the strain gauge (16);
    wherein the strain gauge (16) is integrated at least partially into the fiber composite plastic material forming the at least one component part; and
    wherein the flat spiral spring taps the measurement signal generated by the strain gauge (16).

* * * * *